US005620246A

United States Patent [19]

Uehan

[11] Patent Number: 5,620,246

[45] Date of Patent: Apr. 15, 1997

[54] HEADLAMP FOR AN AUTOMOBILE

[75] Inventor: Hiroyuki Uehan, Shizuoka, Japan

[73] Assignee: Koito Manufacturing Co., Ltd., Tokyo, Japan

[21] Appl. No.: 352,624

[22] Filed: Dec. 9, 1994

[30] Foreign Application Priority Data

Dec. 9, 1993 [JP] Japan .................................... 5-340352
Sep. 19, 1994 [JP] Japan .................................... 6-248332

[51] Int. Cl.$^6$ ...................................................... B60Q 1/04
[52] U.S. Cl. ............................ 362/61; 362/297; 362/346
[58] Field of Search .............................. 362/61, 346, 297

[56] References Cited

U.S. PATENT DOCUMENTS

| | | | |
|---|---|---|---|
| 4,612,608 | 9/1986 | Peitz . | |
| 4,731,713 | 3/1988 | Perthus . | |
| 4,731,731 | 3/1988 | Cochran . | |
| 4,803,601 | 2/1989 | Collot et al. . | |
| 4,827,367 | 5/1989 | Luciani . | |
| 5,086,376 | 2/1992 | Blusseau . | |
| 5,192,124 | 3/1993 | Kawashima et al. . | |
| 5,432,685 | 7/1995 | Taksukawa et al. ...................... | 362/61 |

FOREIGN PATENT DOCUMENTS 4138322 8/1992 Germany .

*Primary Examiner*—Ira S. Lazarus
*Assistant Examiner*—Sara Sachie Raab
*Attorney, Agent, or Firm*—Sughrue, Mion, Zinn, Macpeak & Seas

[57] ABSTRACT

A headlamp for an automobile includes a reflector, a filament, and a front lens, and the filament is disposed along the principal optical axis of the reflector. The basic surface of the reflecting surface has a shape obtained by adding deformations to an elliptical paraboloid which has an elliptical cross section at a plane perpendicular to the principal optical axis. The focal length of a cross section (parabola) of a basic surface in a horizontal plane including the principal optical axis is set to be smaller than the focal length of a cross section (parabola) of the basic surface in a vertical plane including the principal optical axis. A twist is added to a region of the reflecting surface located in close proximity to the horizontal plane including the principal optical axis, and upper edges of the projected filament images of the filament due to that region are aligned, thereby forming a line constituting a basis of a horizontal cutline. Also, another headlamp for an automobile includes a reflector, a filament, and a front lens, and the filament is disposed such that its central axis orthogonally intersects the principal optical axis of the reflector and extends in the horizontal direction. The basic surface of the reflecting surface has a shape obtained by adding deformations to an elliptical paraboloid which has an elliptical cross section at a plane perpendicular to the principal optical axis.

9 Claims, 16 Drawing Sheets

HEADLAMP FOR AN AUTOMOBILE

BACKGROUND OF THE INVENTION

The present invention relates to a novel headlamp for an automobile which is capable of forming a clear horizontal cutline and of forming a light-distribution pattern of light which is diffused widely in the horizontal direction.

Among automobile headlamps, the basic arrangement of an auxiliary headlamp (a fog lamp or the like) for an automobile is such that a coil-like filament is disposed in the vicinity of the focus of a reflector having the shape of a paraboloid-of-revolution, in such a manner as to extend along the optical axis of the reflector (so-called C-8 type filament arrangement), and a front lens )laving diffusing lens steps is disposed in front of the reflector, so as to control the light-distribution.

Namely, light-distribution control is made to obtain a specified light-distribution pattern having a horizontal cutline by diffusing the projection pattern of the filament due to the reflector into the horizontal direction through the diffusing lens steps of the front lens.

As another arrangement of an auxiliary headlamp for an automobile, one is known in which a coil-like filament is disposed in the vicinity of the focus of a reflector having the shape of a paraboloid-of-revolution, in such a manner as to orthogonally intersect the optical axis of the reflector (so-called C-6 type filament arrangement), and a front lens having diffusing lens steps is disposed in front of the reflector, so as to control the light distribution.

However, a projection pattern obtained by the reflector has a horizontally inverted 8-shape in this arrangement, and, in this state, it is impossible to obtain a light-distribution pattern which conforms to standards. For this reason, light-distribution control is made to obtain a specified light-distribution pattern having a horizontal cutline by diffusing the projection pattern due to the reflector into the horizontal direction through the diffusing lens steps of the front lens.

With the conventional auxiliary headlamp for an automobile, there are problems in that the cutline becomes unclear due to a control limit of the diffusing lens steps, which play a principal role in the light-distribution control, i.e., since the cutline is formed as an upper edge portion of the projection pattern obtained from the reflector, is forcibly made horizontal by the diffusing lens steps, it is difficult to form a clear cutline without resorting to the aid of a shade disposed below the filament, and in that the light oriented toward the upper side of the horizontal line constitutes dazzling light for an oncoming vehicle. In addition, there is a problem in that it is difficult to obtain a pattern in which the light is diffused widely in the horizontal direction.

SUMMARY OF THE INVENTION

Accordingly, to overcome the above-described problems, in accordance with the first aspect of the present invention, a headlamp for an automobile which has a reflector and a front lens disposed in front thereof and which is capable of obtaining a light-distribution pattern having a horizontal cut line parallel to a horizontal line, is provided with the following arrangements (a) to (d):

(a) a light source member is disposed such that its central axis extends along a principal optical axis of the reflector;

(b) a reflecting surface has a basic surface of a shape obtained by adding deformations to an elliptical paraboloid which has an elliptical cross section at a plane perpendicular to the principal optical axis;

(c) a focal length of a parabola which is a sectional figure obtained when the basic surface is cut by a horizontal plane including the principal optical axis, is set to be smaller than a focal length of a parabola which is a sectional figure obtained when the basic surface is cut by a vertical plane including the principal optical axis; and (d) a projection pattern obtained by the reflecting surface is located on a lower side of the horizontal line in the light-distribution pattern, a twist is added to a region of the reflecting surface located in close proximity to the horizontal plane including the principal optical axis of the reflector so that upper edges of projected filament images of the light source member due to that region are aligned so as to form a line constituting a basis of the horizontal cutline.

In accordance with the first aspect of the present invention, with respect to projected filament images of the light source member which are disposed in close proximity to the horizontal line and in parallel thereto in the light-distribution pattern, it is possible to form a clear line constituting a basis of the horizontal cutline by aligning their upper edges without providing a shade on the lower side of the light source member. At the same time, by virtue of the operation of the reflecting surface, it is possible to obtain a projection pattern which is diffused horizontally by setting the focal length of the basic surface of the reflecting surface.

In accordance with the second aspect of the present invention, a headlamp for an automobile which has a reflector and a front lens disposed in front thereof and which is capable of obtaining a light-distribution pattern having a horizontal cutline parallel to a horizontal line, is provided with the following arrangements (a) to (d):

(a) a light source member is disposed such that its central axis orthogonally .intersects a principal optical axis of the reflector and extends along the horizontal direction;

(b) a reflecting surface has a basic surface of a shape obtained by adding deformations to an elliptical paraboloid which has an elliptical cross section at a plane perpendicular to the principal optical axis;

(c) when an angle parameter is set in which an angle increases counterclockwise in a front view with a horizontal plane including the principal optical axis as a reference, projected images of the light source member, which are projected forwardly by a region located on an upper side of the horizontal plane including the principal optical axis, is arranged in such a manner that the images move from a first position in a vicinity of the horizontal line to a lower position below the horizontal line with an increase of the angle parameter until the images are located at the lowest position on a vertical line, and then the images rise upward with a further increase in the angle parameter until the projected filament image is positioned at a second position in a vicinity of the horizontal line on an opposite side of the first position with the vertical line placed therebetween, the projected filament images being arranged so that their upper edges do not rise above the horizontal line; and (d) projected filament images of the light source member, which are projected forwardly by a region located on a lower side of the horizontal plane including the principal optical axis, are arranged in such a manner that the images move from a first position in the vicinity of the horizontal line to a lower side of the horizontal line with an increase of the angle parameter, that the images are then located in the vicinity of a point of intersection of the horizontal line and the vertical line, that the images move to the lower side of the horizontal line with a further increase of the angle parameter, and then the images are positioned in the vicinity of the horizontal line on an opposite side of the first position with the vertical line placed therebetween, the projected filament images being arranged so that upper edges of said projected filament images do not rise above the horizontal line.

In accordance with the second aspect of the present invention, the tendency of the layout of the projected filament images of the light source member is regulated by adding deformations to an elliptical paraboloid whose cross section at a plane perpendicular to the principal optical axis is an ellipse, so as to ensure that the projected filament images are not located on the upper side of the horizontal line. In addition, with respect to projected filament images of the light source member which are disposed in close proximity to the horizontal line and in parallel thereto in the light-distribution pattern, the projected filament images are arranged so that their upper edges do not rise above the horizontal line, thereby making it possible to form a clear line constituting a basis of the horizontal cutline.

BRIEF DESCRIPTION OF THE DRAWINGS

FIG. 2(*b*) is a diagram explaining the relationship between a twisting operation of the curved surface and the layout of filament images;

DETAILED DESCRIPTION OF THE PREFERRED EMBODIMENTS

An auxiliary headlamp for an automobile in accordance with a first embodiment of the present invention will be described with reference to FIGS. 1 to 10. It should be noted that the illustrated embodiment shows an example in which the present invention is applied to a fog lamp for an automobile (having a large horizontal diffusion angle of 70° to 80° or thereabouts, and capable of illuminating up to an illumination area of a cornering lamp).

Figure 1:
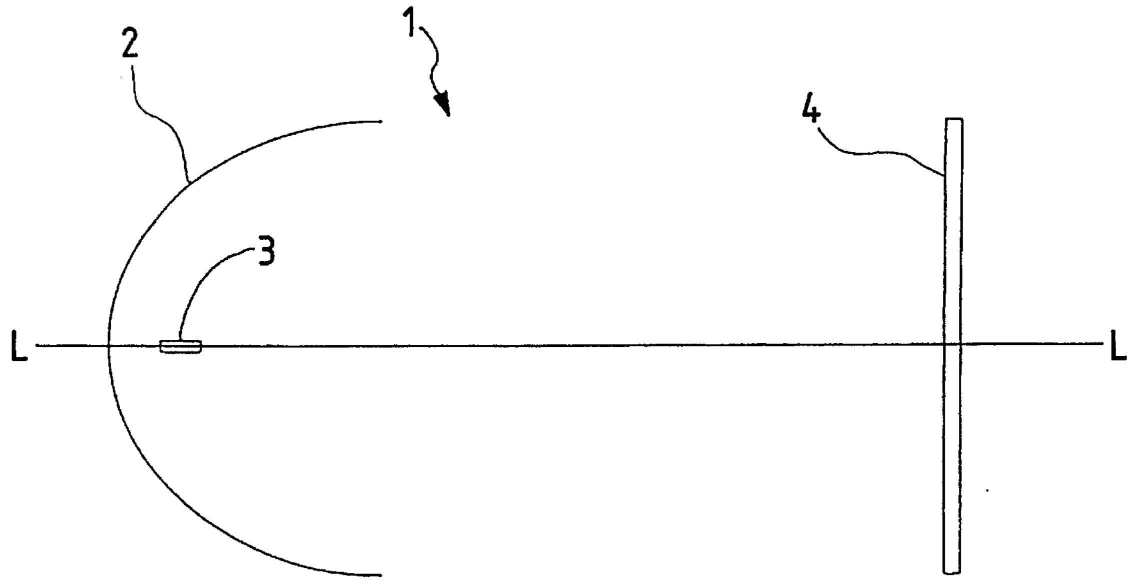
FIG. 1 is a schematic diagram illustrating an arrangement of an auxiliary headlamp for an automobile in accordance with a first embodiment of the present invention.

As shown in a schematic plan view in FIG. 1, an auxiliary headlamp 1 for an automobile comprises a reflector 2, a filament 3 disposed such that its central axis extends along a principal optical axis L—L of the reflector 2, and a front lens 4 disposed in front of the reflector 2.

The reflector 2 is designed to obtain a specified light-distribution pattern having a clear horizontal cutline by making use of the entire reflecting surface without disposing a shade below the filament 3. A basic surface of the reflector 2 is designed by performing parameter control and vector control by using CAD as a free surface which cannot be strictly expressed by an algebraic expression.

The basic surface has a shape which can be obtained by adding deformations by local vector operations or the like to an elliptical paraboloid whose cross section at a plane perpendicular to the principal optical axis L—L of the reflector 2 is an ellipse. The basic surface is generated through a process of generating a group of curves and a subsequent process of generating a group of curved surfaces. The procedures will be briefly described below.

(1) Generation of a Group of Curves (1-a) Input of Parameters

First, the focal length of a basic parabola, a deformation ratio thereof, the magnitude of a tangent, an aiming angle of a beam, and the like are inputted to a computer.

(1-b) Calculation of Curve Expressions

After the coordinates of a starting point and a terminal point of a curve are determined on the basis of the basic parabola and the deformation ratio thereof, the direction of a tangent vector is determined from an aiming angle of the beam, and the magnitude thereof is defined to determine a free curve (e.g., a Ferguson's curve).

(2) Generation of a Group of Curved Surfaces (2-a) Input of Parameters

An instruction as to whether or not to impart a restraining (orthogonally intersecting) condition to the tangent vector, the diameter of the basic ellipse, a twist vector, and the like are inputted to the computer.

Figure 2A:
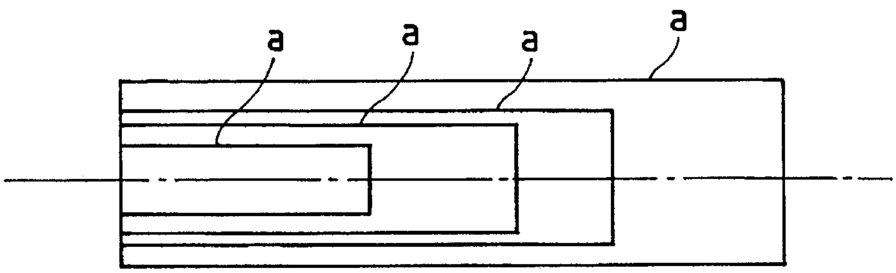
FIGS. 2(*a*) and 2(*b*) are diagrams explaining an optical effect of curved surface operations in accordance with the present invention, in which FIG. 2(*a*) is a diagram illustrating the relationship between a restraining condition of a tangent vector and a layout of filament images.
Figure 2B:
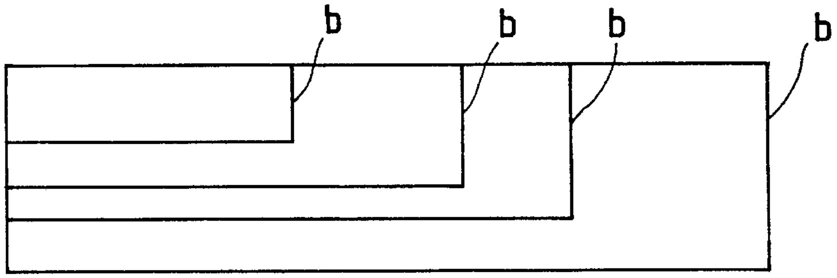

Incidentally, the restraining condition with respect to the tangent vector corresponds to an optical operation in which the longitudinal central axes of filament images a, a, . . . are aligned as shown in FIG. 2(*a*), while a twisting operation with respect to the tangent corresponds to an optical operation in which upper edges of filament images b, b, . . . are aligned by moving the filament images in a direction orthogonal to the longitudinal direction as shown in FIG. 2(*b*) (for details, refer to U.S. Pat. No. 5,192,124).

(2-b) Calculation of Expressions of Curved Surfaces

Surface patches (e.g., Coons' bicubic patches or the like) are generated. At that time, in the determination of a patch coefficient, the coordinates of a point, a tangent vector concerning curvilinear coordinates (curved surface parameters u, v), a twist vector, and the like are required.

Since all the coordinates of a point and a part of tangent vectors are determined by free curves that have already been obtained, a remaining portion of the tangent vectors is determined from shape parameters of the basic ellipse, a restraining condition, and a twisting angle, and the magnitude thereof is adjusted. In addition, in the calculation of the twist vector, Adini's method, Forrest's method, or the like may be used, as required.

The generation of such a free surface is effected by dividing the basic surface into a number of control sections. For example, as shown in FIG. 3, the basic surface is divided into four parts by a vertical plane and a horizontal plane including the principal optical axis L—L, and the shape of the surface of each of the divided regions is determined.

Figure 3:
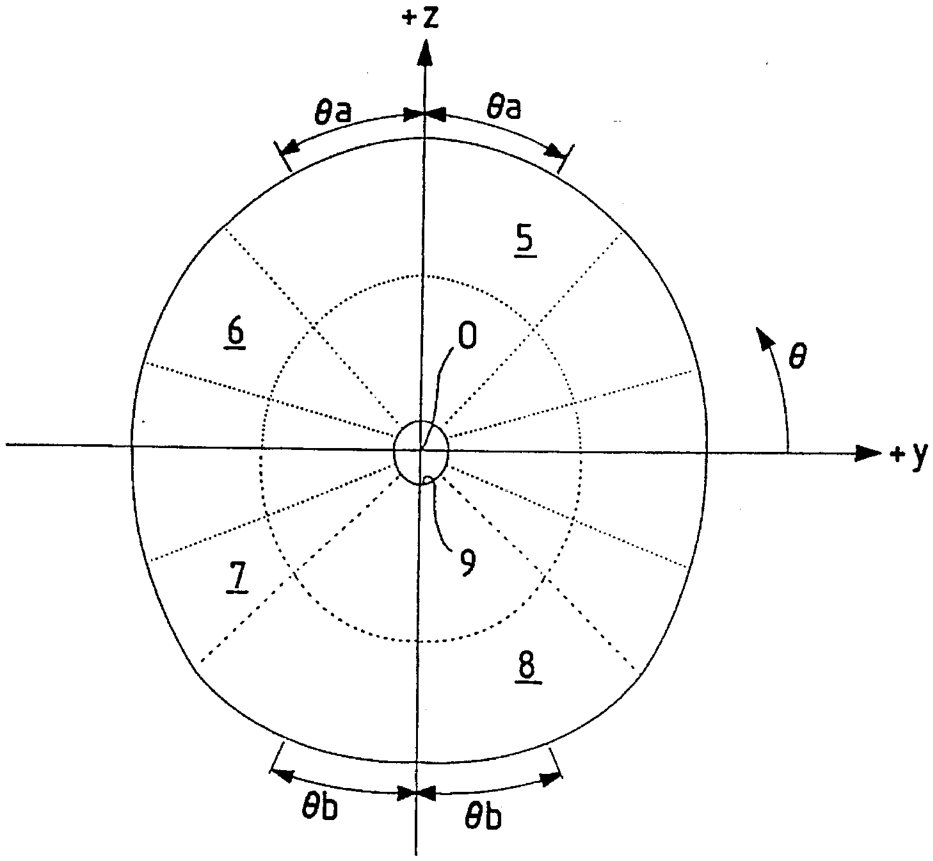
FIG. 3 is a front elevational view illustrating a basic surface of a reflector in accordance with the first embodiment of the present invention.

In FIG. 3, if it is assumed that the principal optical axis of the basic surface is an x-axis (i.e., an axis perpendicular to the plane of the paper, a direction towards this side being set as a positive direction), that an axis which orthogonally intersects the x-axis and extends in the horizontal direction is a y-axis (the rightward direction in FIG. 3 being set as a positive direction), that an axis which orthogonally intersects the x- and y-axes and extends in the vertical direction is a z-axis (an upward direction in FIG. 3 being set as a positive direction), and that an origin of this orthogonal coordinate system is a point O, then regions 5, 6, 7, and 8 are respectively located in the first quadrant, the second quadrant, the third quadrant, and the fourth quadrant of a y-z plane as viewed from the front. Namely, if a parameter θ on an angle about the x-axis is introduced, and its reference axis is set as a positive axis of the y-axis, when the basic surface is viewed from the front, the region 5 occupies the range of $0° \leqq \theta \leqq 90°$, the region 6 occupies the range of 90°≦θ180°, the region 7 occupies the range of $180° \leqq \theta \leqq 270°$, and the region 8 occupies the range of $270° \leqq \theta \leqq 360°$. It should be noted that such a division into regions is for convenience' sake, and since the adjacent regions are continuous in their boundary, no step is generated in the boundary.

In addition, the shape of the surface of the region 5 and the shape of the surface of the region 6 are made symmetrical about the x-z plane, while the shape of the surface of the region 7 and the shape of the surface of the region 8 are made symmetrical about the x-z plane.

Reference numeral 9 denotes a bulb attaching hole, and is formed in a substantially elliptic shape with the origin O as the center.

Figure 4:
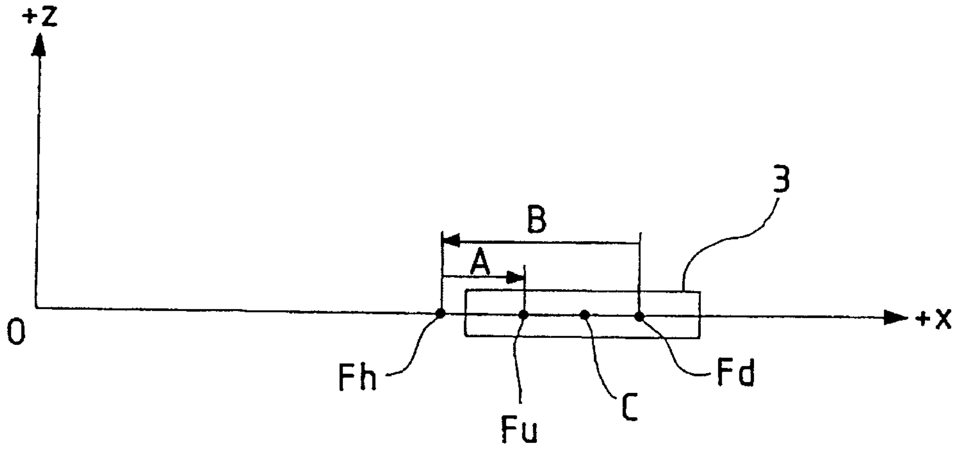
FIG. 4 is a diagram illustrating the positional relationship between foci of basic parabolas and the filament.

FIG. 4 shows the positional relationship between the focus of the basic parabola and the filament 3.

A point Fh represents the focus of a basic parabola, i.e., a boundary line between the basic surface and the x - y plane, and is positioned on the x-axis in the rear of a rear end of the filament 3 (close to the origin O).

In addition, a point Fu represents the focus of a basic parabola, i.e., a boundary line between the regions 5 and 6, and is positioned on the x-axis in front of the rear end of the filament 3 and in the rear of a central point C of the filament 3.

A point Fd represents the focus of a basic parabola, i.e., a boundary line between the regions 7 and 8, and is positioned on the x-axis in front of the central point C of the filament 3 and in the rear of a front end of the filament 3.

It should be noted that the focal positions of the basic parabolas at respective positions on the basic surface vary, and they move substantially continuously on the x-axis, as will be described later. Accordingly, the aforementioned point Fh and the like means virtual foci of the basic surface.

Figure 5:
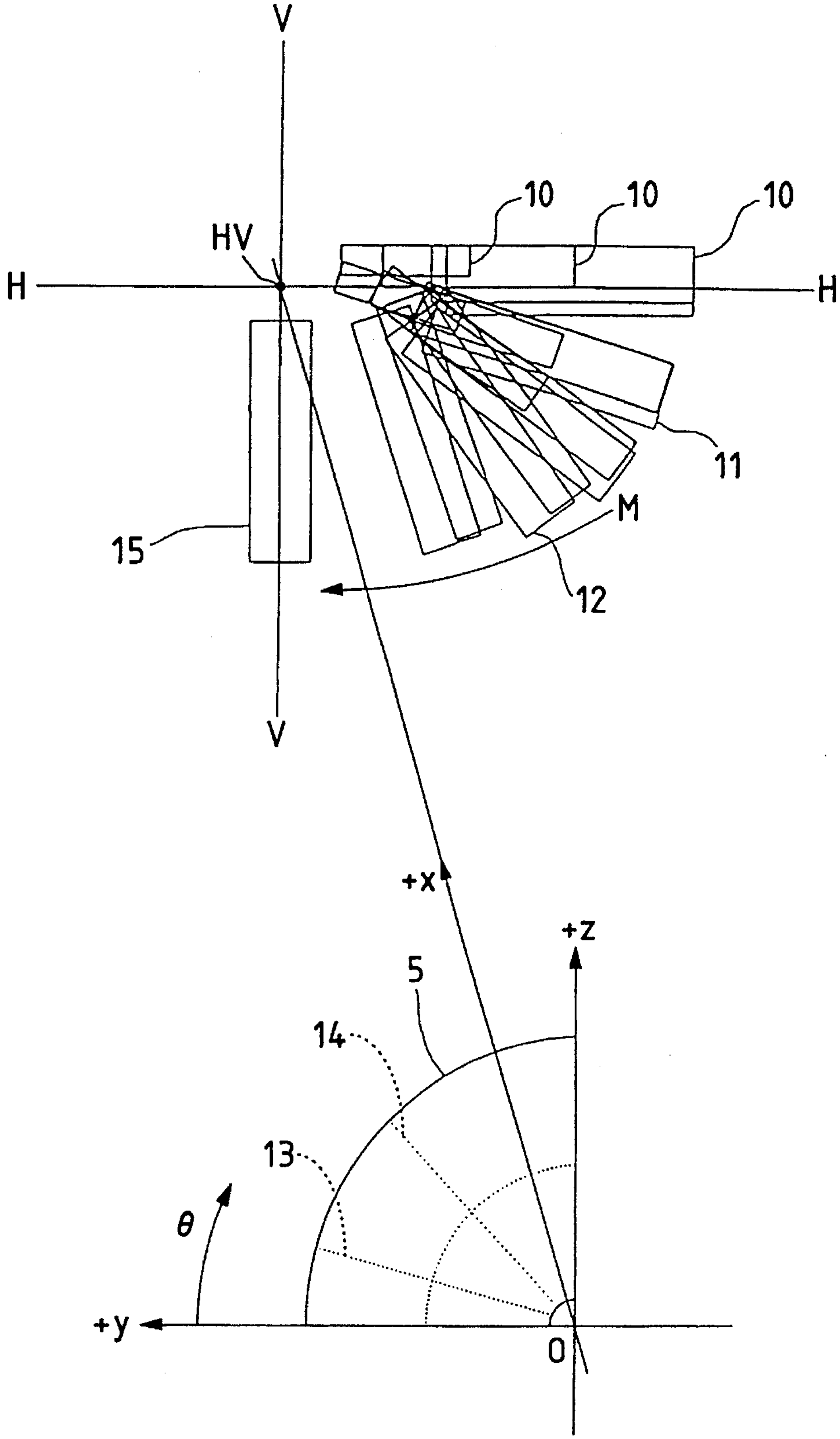
FIG. 5 is a diagram illustrating a region 5 and a tendency of the layout of its filament images.
Figure 6:
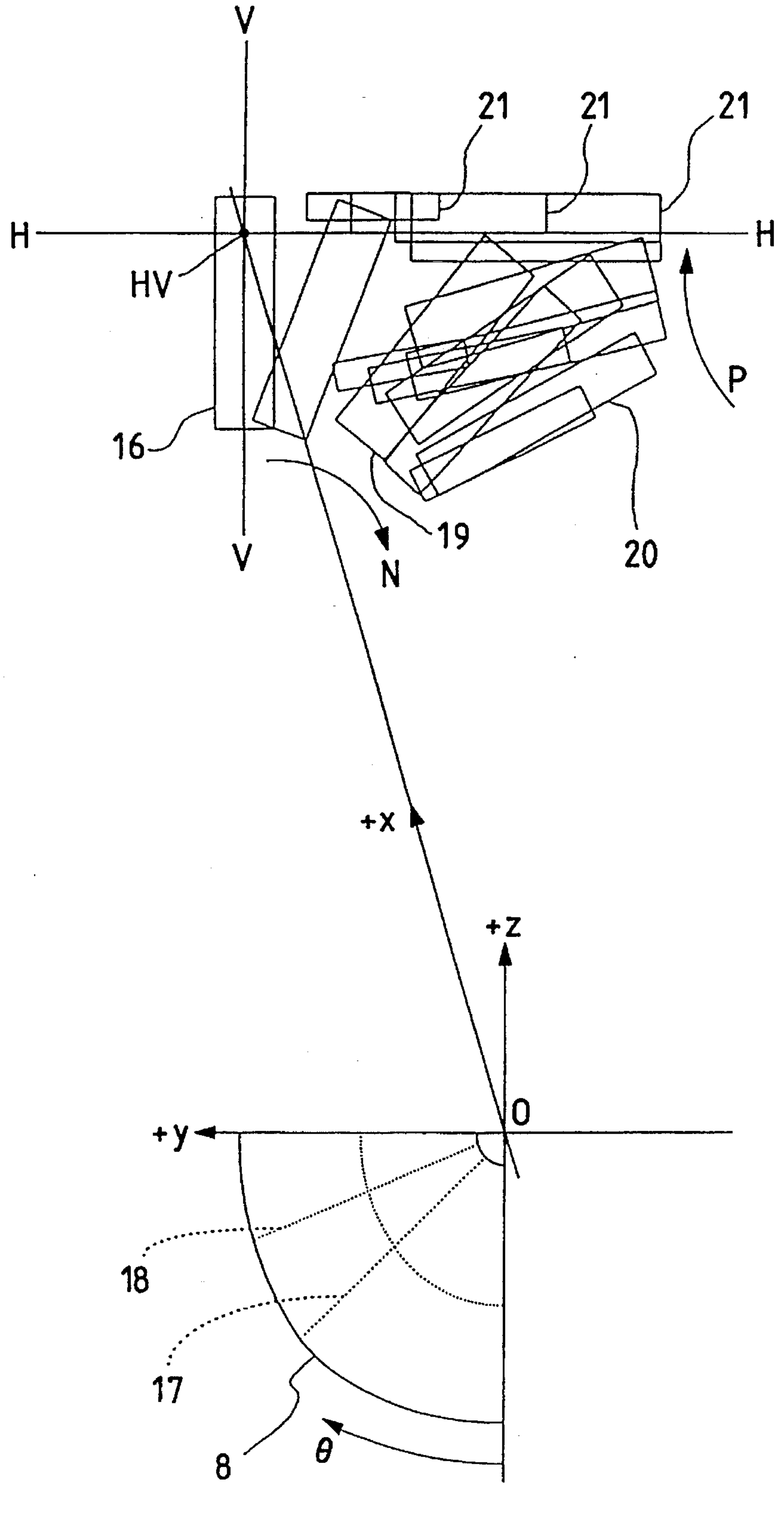
FIG. 6 is a diagram illustrating a region 8 and a tendency of the layout of its filament images.

FIGS. 5 and 6 show layouts of filament images which are projected onto a distant screen by the regions 5 and 8 as viewed forwardly from the rear surface of the basic surface. Incidentally, in these drawings, the line "H—H" indicates a line of intersection between the x-y plane and the screen disposed in a state in which the screen orthogonally intersects the principal optical axis, whilc the line "V—V" indicates a line of intersection between the screen and the x-z plane, and the point "HV" indicates a point of intersection between the two lines.

FIG. 5 shows the region 5 and a representative layout of filament images which are projected by the region 5.

As for the projection pattern obtained by the region 5, the images are located substantially on the right-hand side of the line V—V and in the vicinities of the line H—H and on the lower side thereof.

Filament images 10, 10, . . . located in the vicinities of the line H—H are projected by representative points located on the boundary line in the x - y plane in the region 5, and their upper edges contribute to the formation of the horizontal cutline in the light-distribution pattern. Namely, a region which is close to the x-y plane in the region 5 is provided with the restraining condition concerning the tangent vector and a twisting operation, so that the upper edges of the filament images 10, 10, . . . close to the line H—H are aligned in such a manner as to extend along the horizontal line H—H in parallel thereto.

As the value of the angle parameter θ increases, the filament image changes as shown by arrow M. For instance, filament images 11 and 12 are respectively projected by representative points on lines 13 and 14 indicated by the broken lines in FIG. 5.

A filament image 15 located on the line V—V is projected by representative points positioned on the boundary line in the x-z plane in the region 5. As for the filament image due to an angular range (shown by "θa" in FIG. 3) close to the x-z plane in the region 5, the amount of change in the direction of arrow M is large with an increase of the angle parameter θ. This is because, in the range $0° \leqq \theta \leqq 90° - \theta a$, the focal length of the basic parabola gradually increases with an increase of θ, and approaches the point Fu from the point Fh, as shown by arrow A in FIG. 4. On the other hand, in the range $90° \geqq \theta > 90° - \theta a$, the focal length becomes suddenly large when the focus approaches the point Fu.

In addition, the fact that the focal length of the basic parabola in the vertical direction in the region 5 is set to be larger than the focal length of the basic parabola in the horizontal direction in the region 5 offers an optical effect in that the degree of horizontal extension becomes greater than the vertical extension in the projection pattern.

It should be noted that the region 6 and the layout of filament images obtained thereby are clear from the symmetric nature of the surface configuration with respect to the x-z plane, and since it will suffice if the bilateral relationship in the description concerning the region 5 is reversed, a description thereof will be omitted.

FIG. 6 shows the region 8 and a representative layout of filament images which are projected by the region 8.

As for the projection pattern obtained by the region 8, the images are located substantially on the right-hand side of the line V—V and in the vicinities of the line H—H and on the lower side thereof.

Filament images 16 located on the line V—V are projected by representative points located on the boundary line in the x-z plane in the region 8. As the value of the angle parameter θ increases, the filament image changes as shown by arrow N. That is, as is apparent from filament images 19 and 20 respectively projected by representative points on lines 17 and 18 shown by the broken lines in FIG. 6, the position of the filament image changes clockwise in such a manner as to move away from the line V—V; however, when 8 becomes further great, the filament image undergoes a change in such a manner as to approach the line H—H, as shown by arrow P.

As for the filament image due to an angular range (shown by "θb" in FIG. 3) close to the x-z plane in the region 8, the amount of change in the direction of arrow N is large with an increase of the angle parameter θ. This is because, in the range $270° \leqq \theta \leqq 270° + \theta b$, the focal length of the basic parabola changes sharply with an increase of θ. Namely, after the focus has changed sharply from the point Fd in FIG. 4 in the direction of arrow B, the focus gradually approaches the point Fh with an increase of θ.

Filament images 21, 21, . . . located in the vicinities of the line H—H are projected by representative points located on the boundary line in the x-y plane in the region 8, and their upper edges contribute to the formation of the horizontal cutline in the light-distribution pattern. Namely, a region which is close to the x-y plane in the region 8 is provided with the restraining condition concerning the tangent vector and a twisting operation, so that the upper edges of the filament images 21, 21, . . . close to the line H—H are aligned in such a manner as to extend along the horizontal line H—H in parallel thereto.

It should be noted that the region 7 and the layout of filament images obtained thereby are clear from the symmetric nature of the surface configuration with respect to the x-z plane, and since it will suffice if the bilateral relationship in the description concerning the region 8 is reversed, a description thereof will be omitted.

Figure 7:
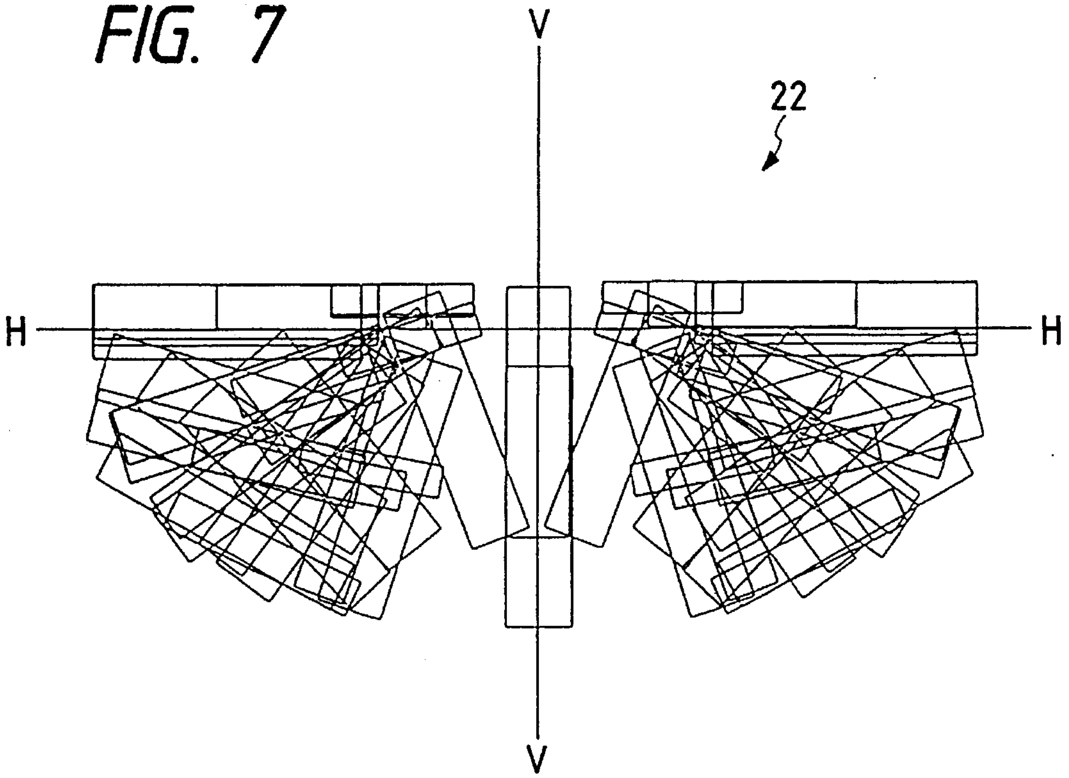
FIG. 7 is a diagram schematically illustrating a projection pattern obtained by the reflector.

FIG. 7 schematically shows a projection pattern 22 which is obtained by the basic surface by synthesizing the patterns in the respective regions.

As for the filament images contributing to the formation of the upper edge of the cutline, since their upper edges are aligned in a direction parallel to the line H—H, they contribute to the formation a clear horizontal cutline. In addition, a projection pattern which is horizontally dispersed by 15° or thereabouts can be obtained only by the operation of the reflecting surface by setting the focal lengths in the basic surface. Moreover, it is possible to prevent a drawback in that luminous intensity becomes insufficient in the range toward this side (toward the vehicle) due to this horizontal diffusion.

It should be noted that although the upper edges in the projection pattern 22 extend into the upper side by rising above the line H—H, the cutline is positioned at or below the horizontal line in the light-distribution pattern by subsequent aiming adjustment of a headlamp assembly.

In addition, an actual reflecting surface has a shape cut from a portion of the above-described basic surface in conformity to the front shape of the headlamp assembly. For instance, in the case of a straight-sided headlamp assembly, a range which is rectangular in a front view is used.

Figure 8:
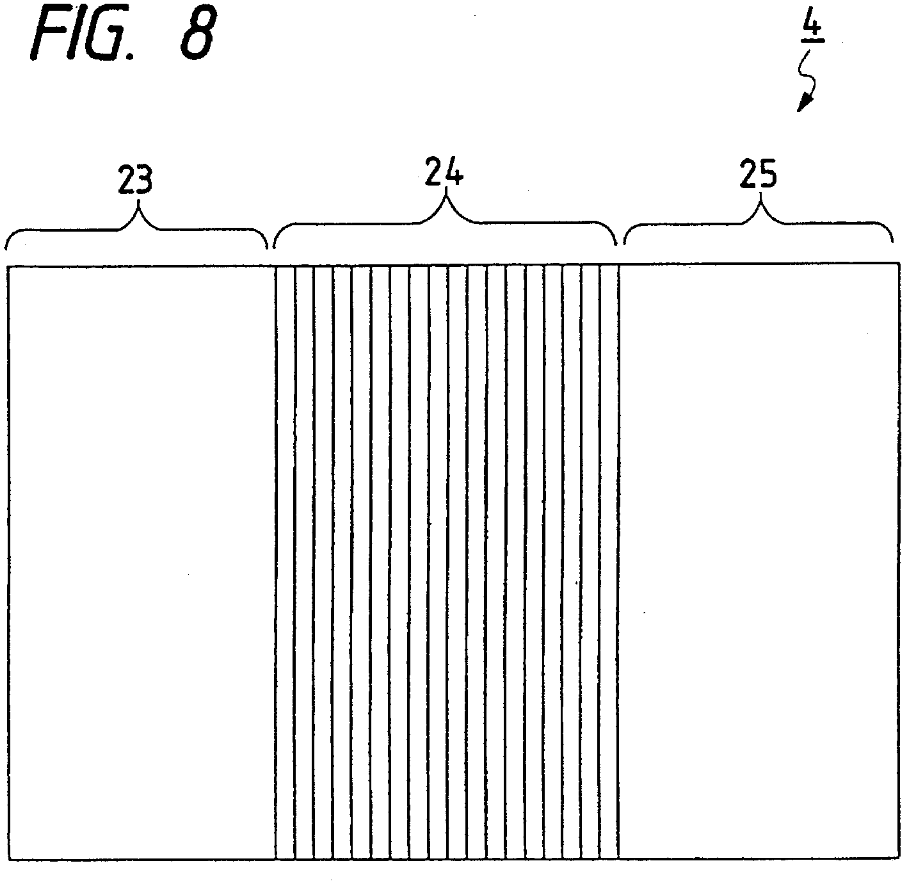
FIG. 8 is a front elevational view schematically illustrating a front lens.

FIG. 8 is a front elevational view schematically illustrating the front lens 4 which is used in the straight-sided headlamp assembly.

The front lens 4 comprises three regions 23, 24, and 25 arranged along the horizontal direction. The horizontally diffusing lens steps are formed only on the reverse surface of the region 24 located in the center. The horizontally diffusing lens steps are not formed in the adjacent regions 23 and 25 on the left- and right-hand sides thereof, so that the regions are made transparent.

Vertically extending cylindrical lens steps are normally used as the horizontally diffusing lens steps. In this example, however, lens steps each having a parabolic horizontal cross section are used to obtain horizontal diffusion by the fog lamp over a wide area including the illuminating area of a cornering lamp.

Figure 9:
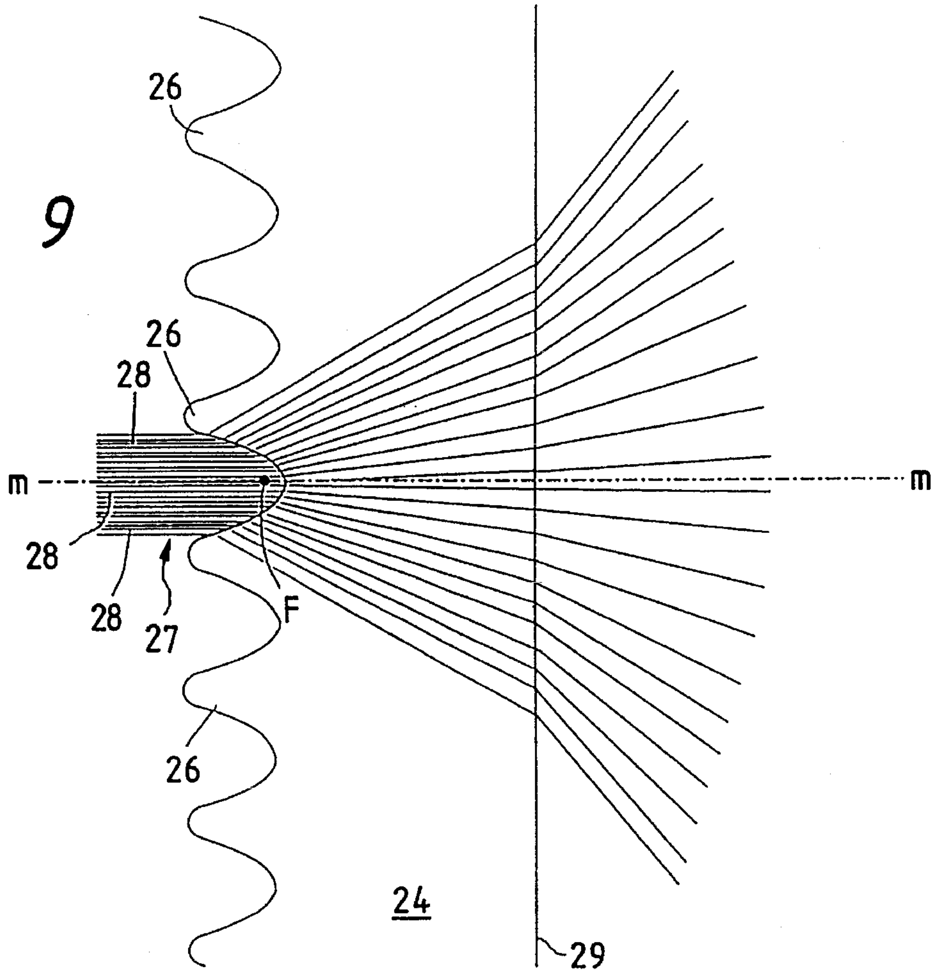
FIG. 9 is a diagram explaining horizontally diffusing lens steps which are formed on the front lens.

FIG. 9 shows an optical path in a case where parallel rays of light are illuminated with respect to one lens step which is an essential portion of the region 24.

As illustrated in the drawing, the surface of the region 24 is made flat, and horizontally diffusing lens steps 26, 26, . . . each having a parabolic horizontal cross section projecting forwardly in a convex shape are arranged on the reverse surface at pitches of several millimeters.

The axis m—m extending in the front-and-rear direction shows an optical axis of a concave portion 27 of each of the horizontally diffusing lens steps 26. Point F located on the axis m—m shows a focus of the parabola. Incidentally, the focal length is set to 0.1 millimeter or thereabouts.

The parallel rays 28, 28, . . . of light made incident upon the concave portion 27 are first diffused at an incident surface and are further diffused more widely at an emergent surface (indicated by numeral 29 in the drawing).

The diffusion by the cylindrical lens steps is based on the light-focusing action, whereas the diffusion by the horizontally diffusing lens steps 26, 26, . . . is based on the diverging action due to the concave surfaces. The light which passes through a point which is more distant from the axis m—m diverges more from the axis m—m.

Figure 10:
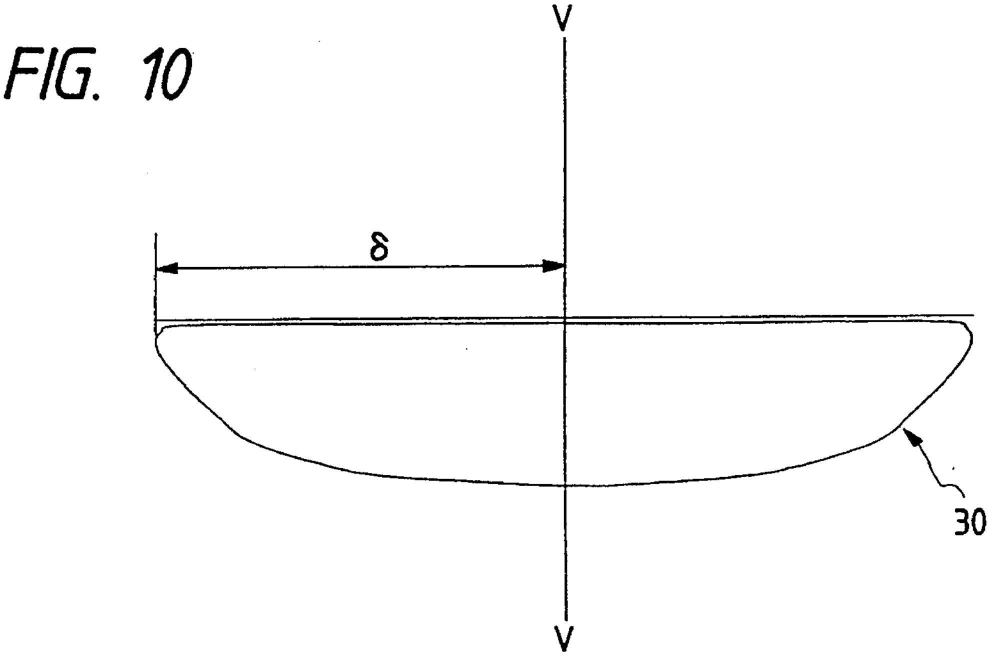
FIG. 10 is a diagram schematically illustrating a light-distribution pattern.

By means of this front lens 4 and the above-described reflecting surface, it is possible to form a light-distribution pattern 30 having a horizontal diffusion angle δ of 70° to 80° or thereabouts, as shown in FIG. 10.

As is apparent from the foregoing description, in accordance with the first embodiment of the present invention, with respect to projected filament images of the light source member which are disposed in close proximity to the horizontal line and in parallel thereto in the light-distribution pattern, it is possible to form a clear line constituting a basis of the horizontal cutline by aligning their upper edges without using a shade. At the same time, by virtue of the operation of the reflecting surface, it is possible to obtain a projection pattern which is diffused horizontally by setting the focal length at vertical and horizontal cross sections concerning the basic surface of the reflecting surface.

In addition, since horizontally diffusing lens steps each having a parabolic horizontal cross section are formed on a reverse surface of the front lens, it is possible to obtain a light-distribution pattern which is diffused widely in the horizontal direction.

Referring now to FIGS. 11 to 21, an auxiliary headlamp for an automobile in accordance with a second embodiment of the present invention will be described. It should be noted that the illustrated embodiment shows an example in which the present invention is applied to a fog lamp for an automobile (having a large horizontal diffusion angle of 60° to 80° or thereabouts, and capable of illuminating up to an illumination area of a cornering lamp).

Figure 11:
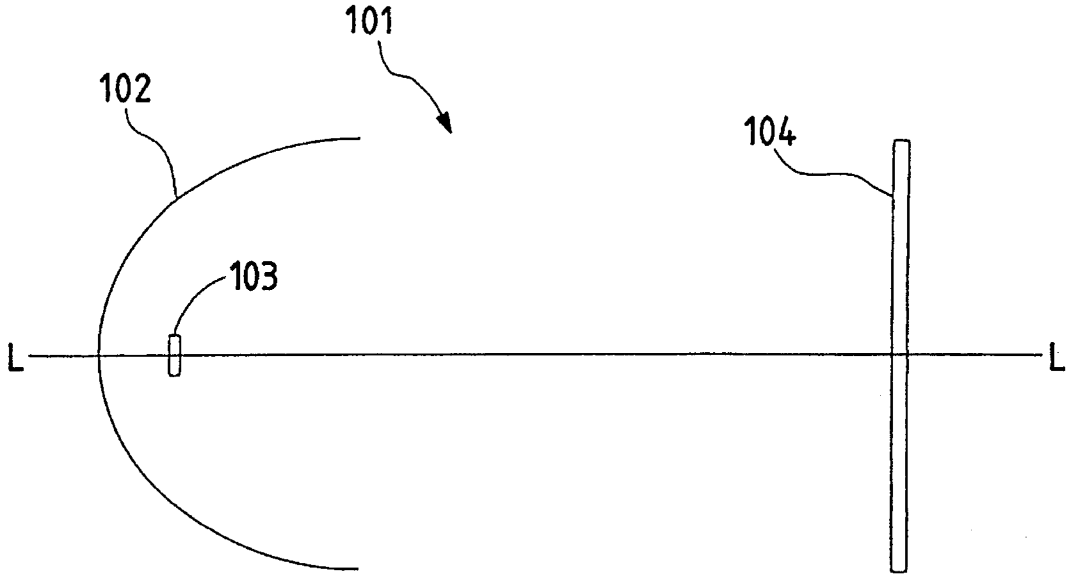
FIG. 11 is a schematic diagram, in a plan view, illustrating an arrangement of an auxiliary headlamp for an automobile in accordance with a second embodiment of the present invention.

As shown in a schematic plan view in FIG. 11, an auxiliary headlamp 101 for an automobile comprises a reflector 102, a filament 103 disposed such that its central axis orthogonally intersects a principal optical axis L—L of the reflector 102 and extends horizontally (so-called C-6 layout), and a front lens 104 disposed in front of the reflector 102. Except for the filament 103, the headlamp 101 in the second embodiment is substantially similar to the headlamp 1 in the first embodiment.

The reflector 102 is designed to obtain a specified light-distribution pattern having a clear horizontal cutline by making use of the entire reflecting surface without disposing a shade below the filament 103. A basic surface of the reflector 102 is designed by performing parameter control and vector control by using CAD as a free surface which cannot be strictly expressed by an algebraic expression.

The basic surface has a shape which can be obtained by adding local deformations by vector operations or the like to an elliptical paraboloid whose cross section at a plane perpendicular to the principal optical axis L—L of the reflector 2 is an ellipse. The basic surface is generated through a process of generating a group of curves and a subsequent process of generating a group of curved surfaces.

Although the procedures are similar to those in the first embodiment, the description thereof will be briefly described below.

(1) Generation of a Group of Curves (1-a) Input of Parameters

First, the focal length of a basic parabola, a deformation ratio thereof, the magnitude of a tangent, an aiming angle of a beam, and the like are inputted to a computer.

(1-b) Calculation of Curve Expressions

After the coordinates of a starting point and a terminal point of a curve are determined on the basis of the basic parabola and the deformation ratio thereof, the direction of a tangent vector is determined from an aiming angle of the beam, and the magnitude thereof is defined to determine a free curve (e.g., a Ferguson's curve).

(2) Generation of a Group of Curved Surfaces (2-a) Input of Parameters

An instruction as to whether or not to impart a restraining (orthogonally intersecting) condition to the tangent vector, the diameter of the basic ellipse, a twist vector, and the like are inputted to the computer.

Incidentally, U.S. Pat. No. 5,192,124 should be referred to concerning the fact that the tendency of the layout of filament images can be controlled by performing the restraint of the tangent vector and a twisting operation with respect to the tangent (although, in this patent, the central axis of the filament is located along the principal optical axis of the reflector, a basic concept is similar to that of this second embodiment).

(2-b) Calculation of Expressions of Curved Surfaces

Surface patches (e.g., Coons' bicubic patches or the like) are generated. At that time, in the determination of a patch coefficient, the coordinates of a point, a tangent vector concerning curvilinear coordinates (curved surface parameters u, v), a twist vector, and the like are required.

Since all the coordinates of a point and a part of tangent vectors are determined by free curves that have already been obtained, a remaining portion of the tangent vectors is determined from shape parameters of the basic ellipse, a restraining condition, and a twisting angle, and the magnitude thereof is adjusted. In addition, in the calculation of the twist vector, Adini's method, Forrest's method, or the like may be used, as required.

The generation of such a free surface is effected by dividing the basic surface into a number of control sections. For example, as shown in FIG. 12, the basic surface is divided into four parts by a vertical plane and a horizontal plane including the principal optical axis L—L, and the shape of the surface of each of the divided regions is determined.

Figure 12:
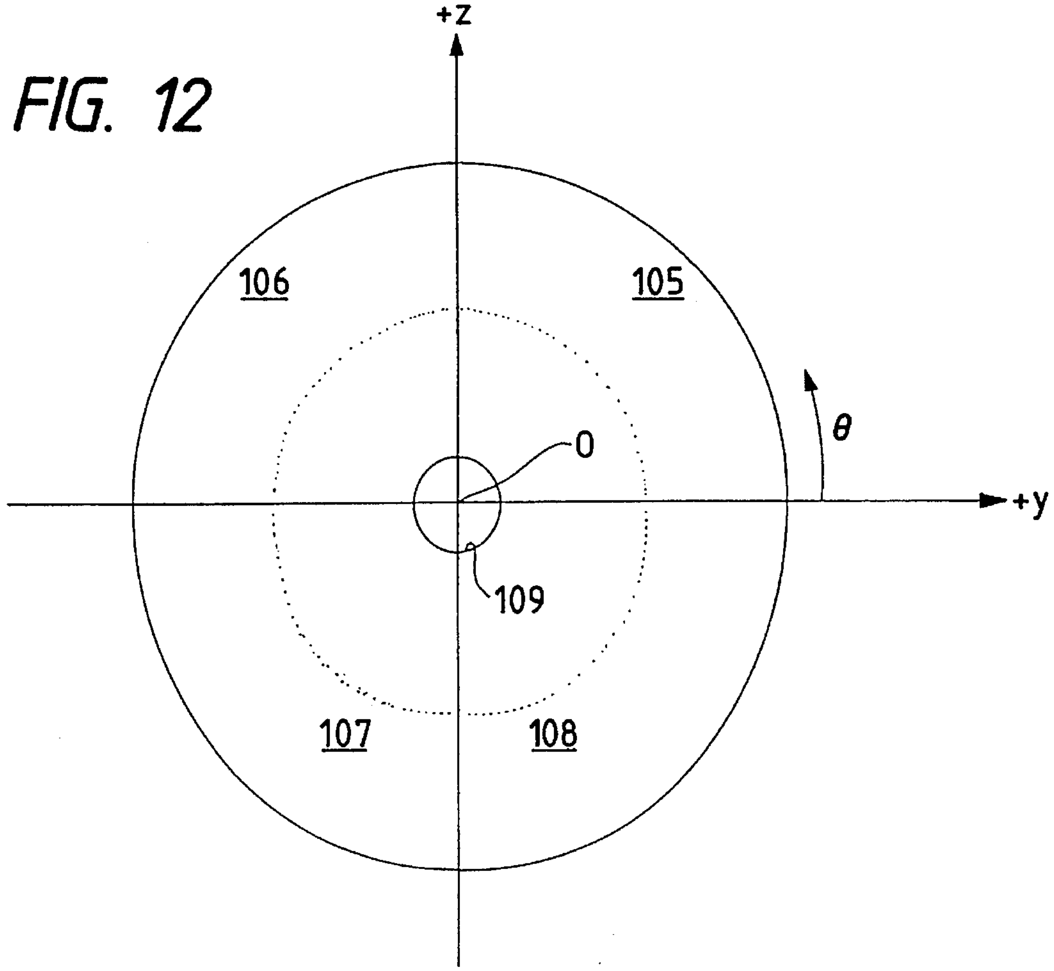
FIG. 12 is a front elevational view illustrating a basic surface of a reflector in accordance with the second embodiment of the present invention.

In FIG. 12, if it is assumed that the principal optical axis of the basic surface is an x-axis (i.e., an axis perpendicular to the plane of the paper, a direction towards this side being set as a positive direction), that an axis which orthogonally intersects the x-axis and extends in the horizontal direction is a V-axis (the rightward direction in the drawing being set as a positive direction), that an axis which orthogonally intersects the x- and y-axes and extends in the vertical direction is a z-axis (an upward direction in the drawing being set as a positive direction), and that an origin of this orthogonal coordinate system is a point O, then regions 105, 106, 107, and 108 are respectively located in the first quadrant, the second quadrant, the third quadrant, and the fourth quadrant of a y-z plane as viewed from the front. Namely, if a parameter $\theta$ (a counterclockwise direction in the drawing being set as a positive direction) on an angle about the x-axis is introduced, and its reference axis is set as a positive axis of the y-axis, when the basic surface is viewed from the front, the region 105 occupies the range of $0° \leqq \theta \leqq 90°$, the region 106 occupies the range of $90° \leqq \theta \leqq 180°$, the region 107 occupies the range of $180° \leqq \theta \leqq 270°$, and the region 108 occupies the range of $270° \leqq \theta \leqq 360°$. It should be noted that such a division into regions is for convenience' sake, and since the adjacent regions are continuous in their boundary, no step is generated in the boundary.

Reference numeral 109 denotes a bulb attaching hole, and is formed in a substantially circular shape with the origin O as the center.

FIGS. 13 to 20 respectively show tendencies of the layout of filament images which are projected onto a distant screen by the regions 106 and 107. Incidentally, in these drawings, the line shown at "H—H" indicates a line of intersection between the x-y plane and the screen disposed at a distance in a state in which the screen orthogonally intersects the principal optical axis, while the line shown at "V—V" indicates a line of intersection between the screen and the x-z plane, and the point "HV" indicates a point of intersection of the two lines. It should be noted that, in the drawings, the number of points is limited as necessary by taking into consideration the fact that an increase in the number of representative points to no purpose makes it difficult to grasp the layout of the filament images. Also, consideration is given to a method of sampling the representative points so that the overlapping of the filament images does not occur noticeably.

Figure 13:
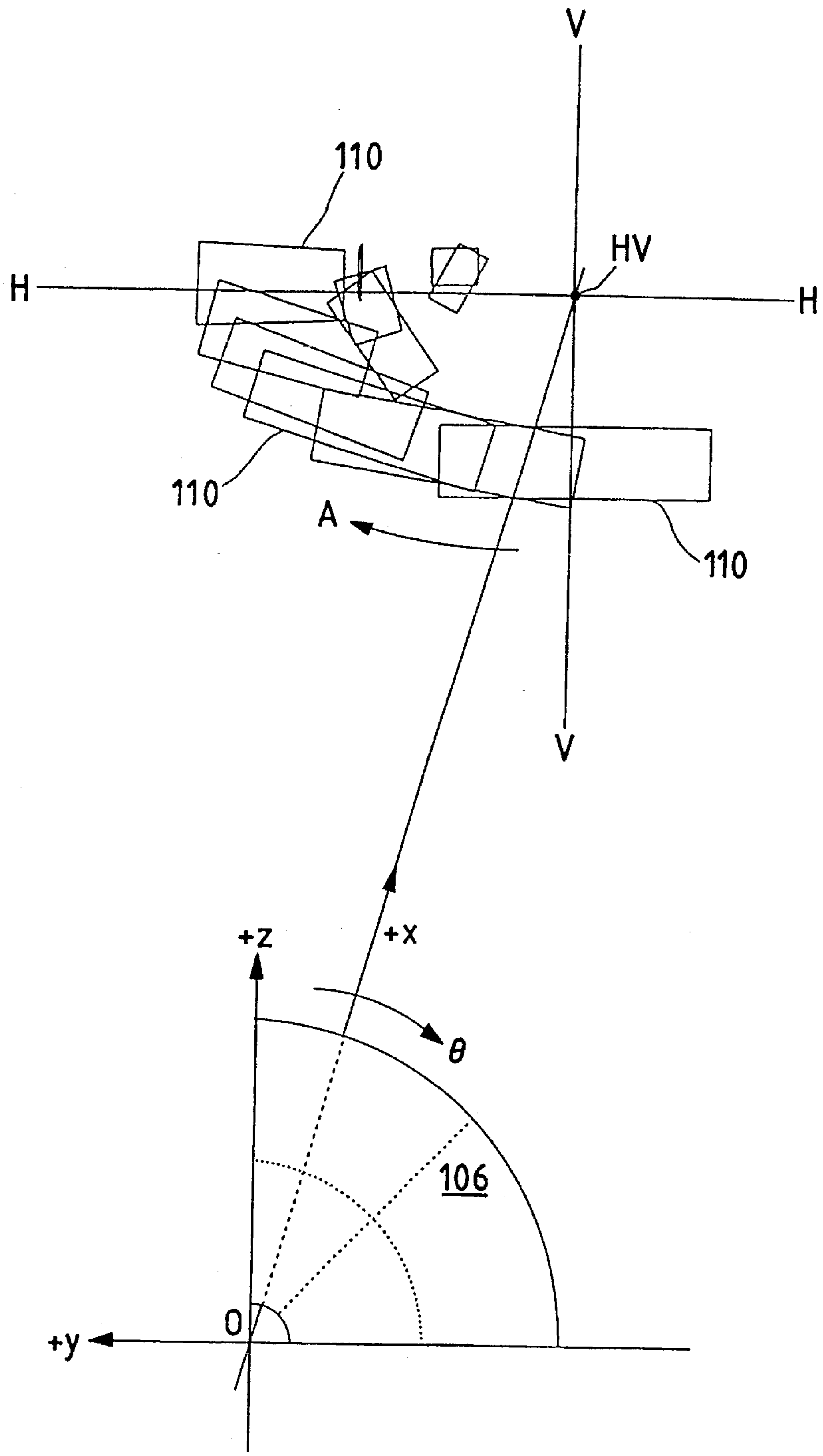
FIG. 13 is a diagram explaining a region 106 and a tendency of the layout of its filament images.

FIG. 13 shows the region 106 and a tendency of the layout of filament images which are projected by the region 106.

Filament images 110, 110, . . . projected by the region 106 are located on the line V—V or on the left-hand side thereof and in the vicinities of the line H—H and on the lower side thereof. As the angle parameter $\theta$ increases from 90°, the filament image approaches the line H—H while it is being gradually inclined with its left-hand side rising diagonally upward, as shown by arrow A.

Figure 14:
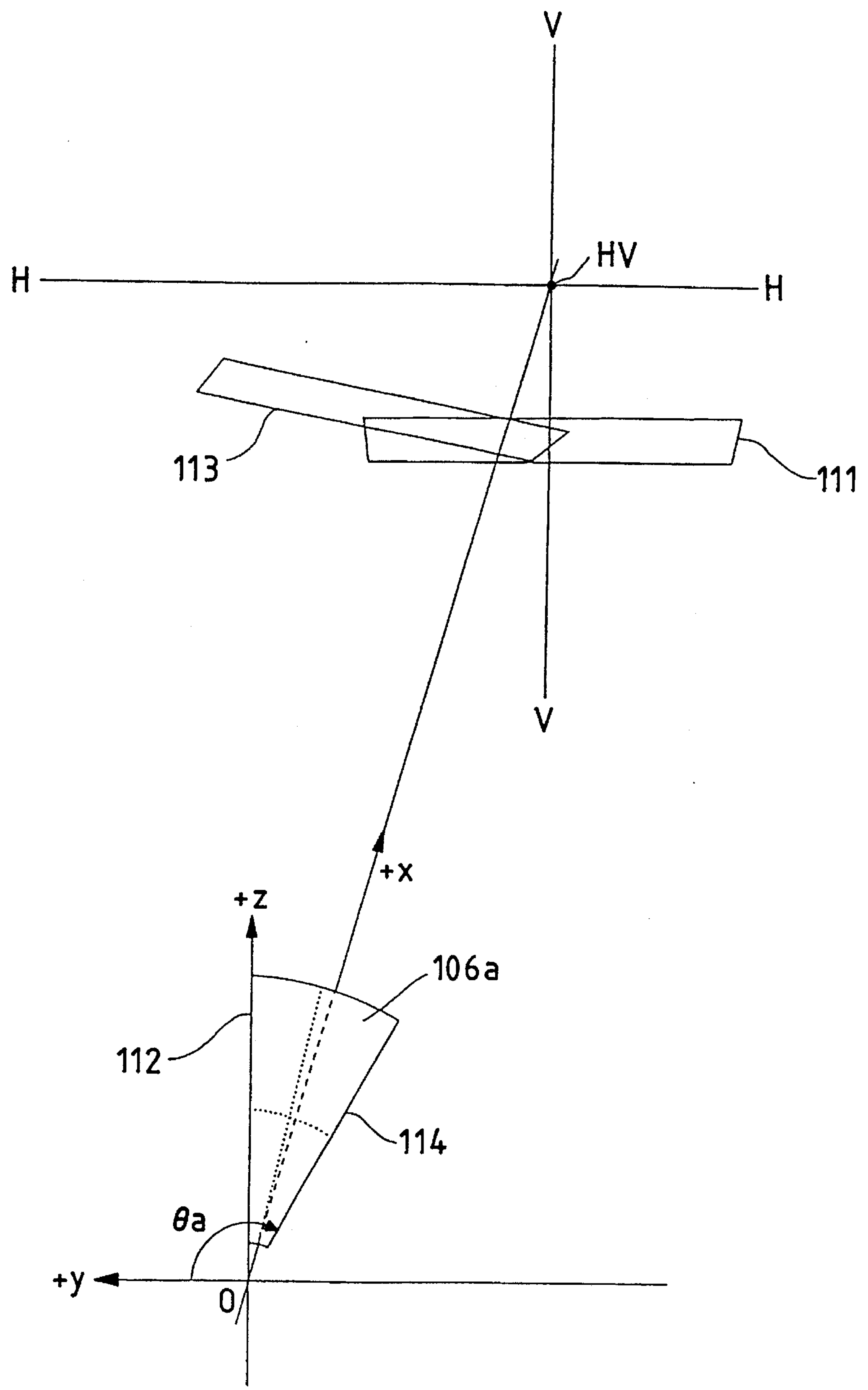
FIG. 14 is a diagram explaining a partial region 106*a* of the region 106 and a tendency of the layout of its filament images.
Figure 15:
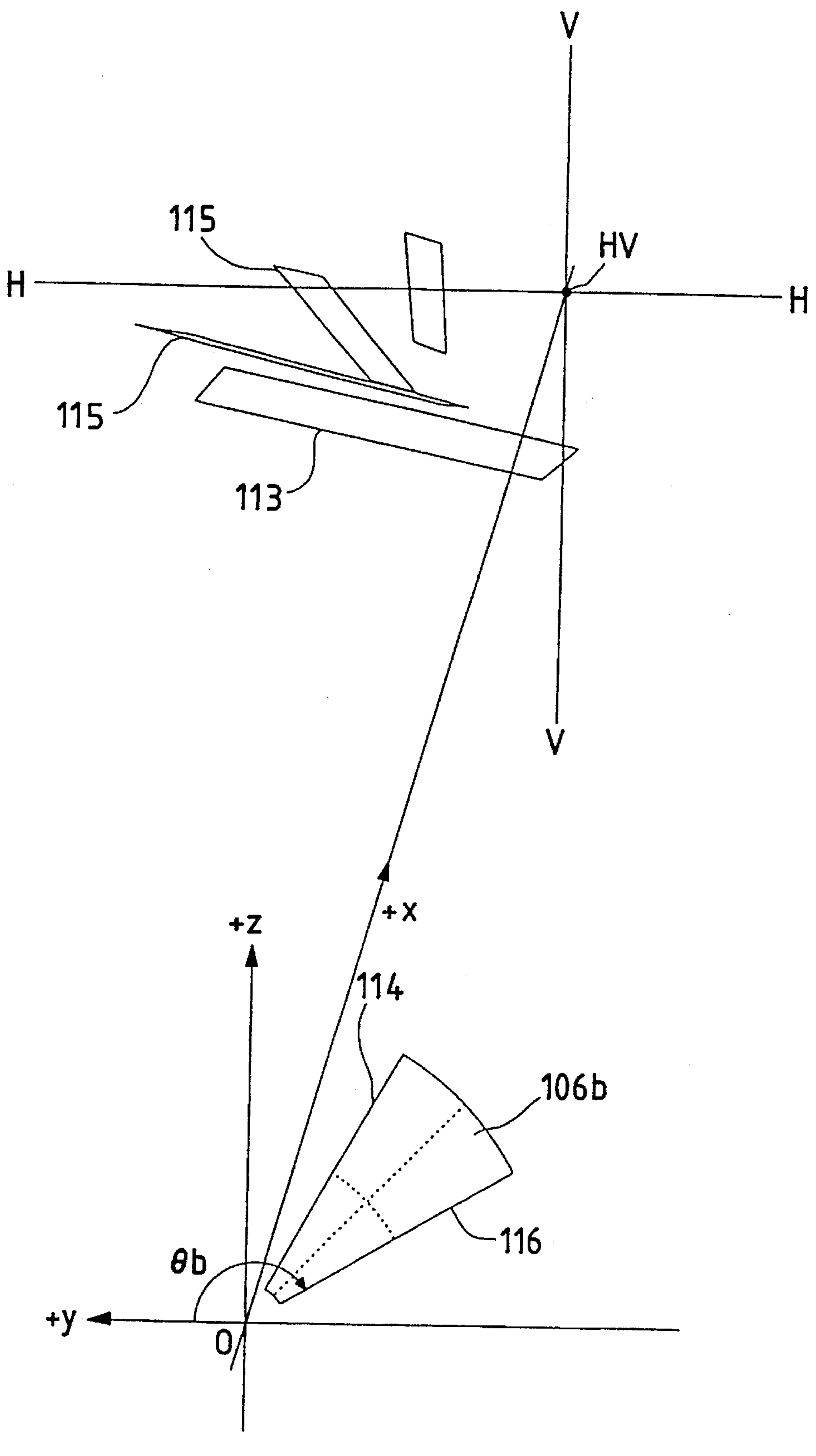
FIG. 15 is a diagram explaining a partial region 106*b* of the region 106 and a tendency of the layout of its filament images.
Figure 16:
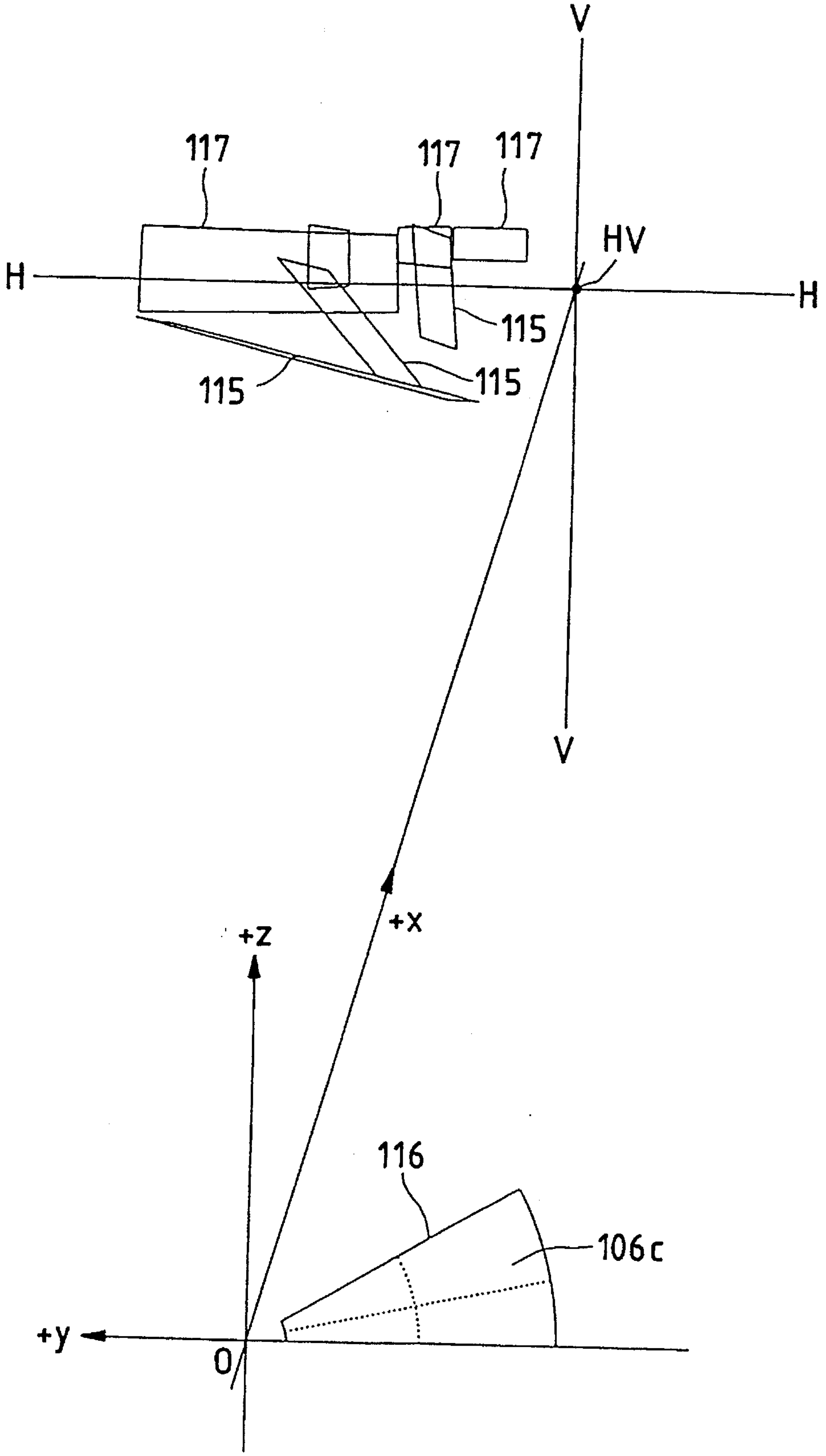
FIG. 16 is a diagram explaining a partial region 106*c* of the region 106 and a tendency of the layout of its filament images.

FIGS. 14 to 16 respectively show tendencies of the layout of the respective filament images in a case where the region 106 is divided into three parts.

FIG. 14 shows a region 106*a* which is located closest to the x-z plane in the region 106, as well as a tendency of the layout of the filament images.

In the drawing, a filament image 111 which is located on the line V—V and extends in the horizontal direction is projected by representative points located on a line of intersection 112 between the region 106*a* and the x-z plane. Meanwhile, a filament image 113 which is located on the left-hand side thereof and which is inclined with its left-hand side rising upward is projected by representative points located on a line of intersection 114 between the region 106*a* and the plane of θ=θa including the x-axis.

FIG. 15 shows a region 106*b* which is located in the middle of the second quadrant in the region 106, as well as a tendency of the layout of the filament images.

The filament images are located on the left-hand side of the line V—V and on the line H—H or on the lower side thereof, and a change is provided in the attitude of the filament image by the twisting operation of the surface.

Filament images 115, 115, . . . in FIG. 15 are projected by representative points located on a line of intersection 116 between a region 106*b* and the plane of θ=θb (>θa) including the x-axis. Incidentally, the filament image 113 which is located on the lowest side and which is inclined with its left-hand side rising upward is projected by representative points located on a line of intersection (equivalent to the aforementioned line of intersection 114) between the region 106*b* and the plane of θ=θa including the x-axis.

FIG. 16 shows a region 106*c* which is located closest to the x-y plane in the region 106, as well as a tendency of the layout of the filament images.

Filament images 17, 17, . . . are located on the left-hand side of the line V—V and on the line H—H or in the vicinities thereof. A filament image which is projected by points closer to the x-axis has a greater area. Incidentally, the filament images 115 in the drawing are projected by the representative points on the line of intersection 116, as described above.

Figure 17:
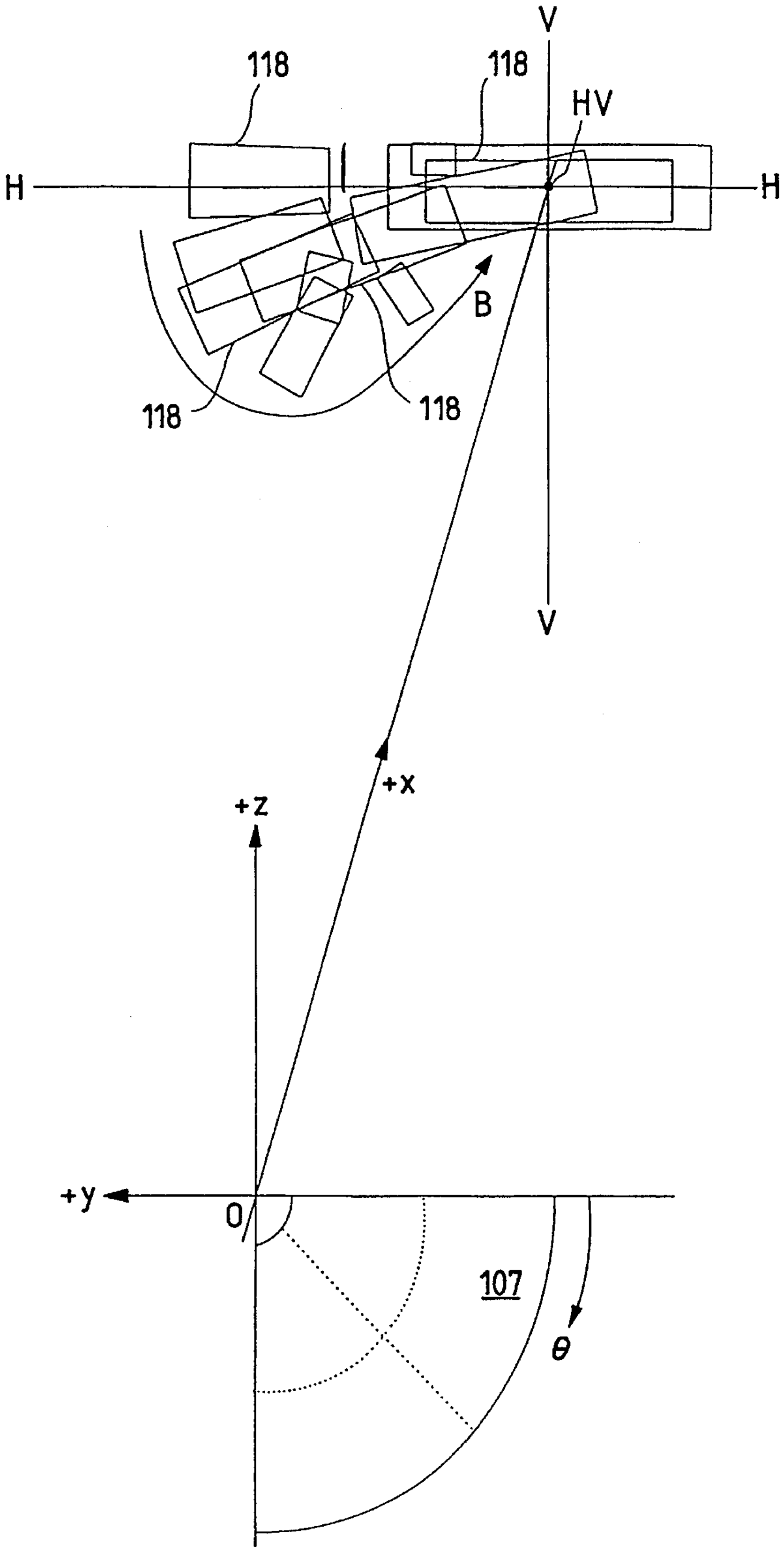
FIG. 17 is a diagram explaining a region 107 and a tendency of the layout of its filament images.

FIGS. 17 shows the region 107 as well as a tendency of the layout of the filament images projected by the same.

Filament images 118, 118, . . . projected by the region 107 are located on the line V—V or on the left-hand side thereof and in the vicinities of the line H—H or on the lower side thereof. As the angle parameter 8 increases from 180°, the filament image is inclined with its left-hand side falling diagonally downward, and then the inclination subsequently becomes gentle, and the filament image approaches the point HV, as shown by arrow B.

Figure 18:
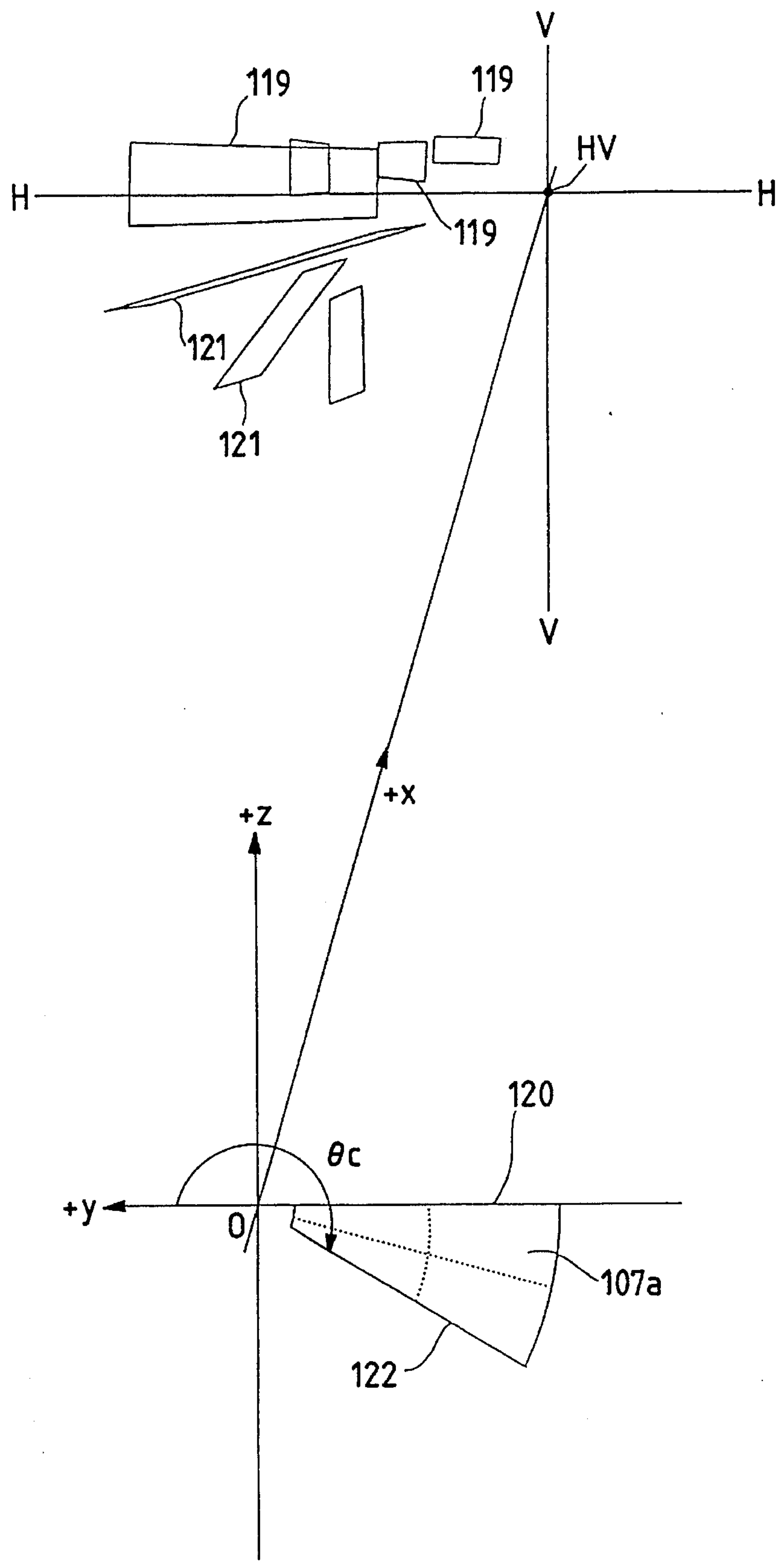
FIG. 18 is a diagram explaining a partial region 107*a* of the region 107 and a tendency of the layout of its filament images.
Figure 19:
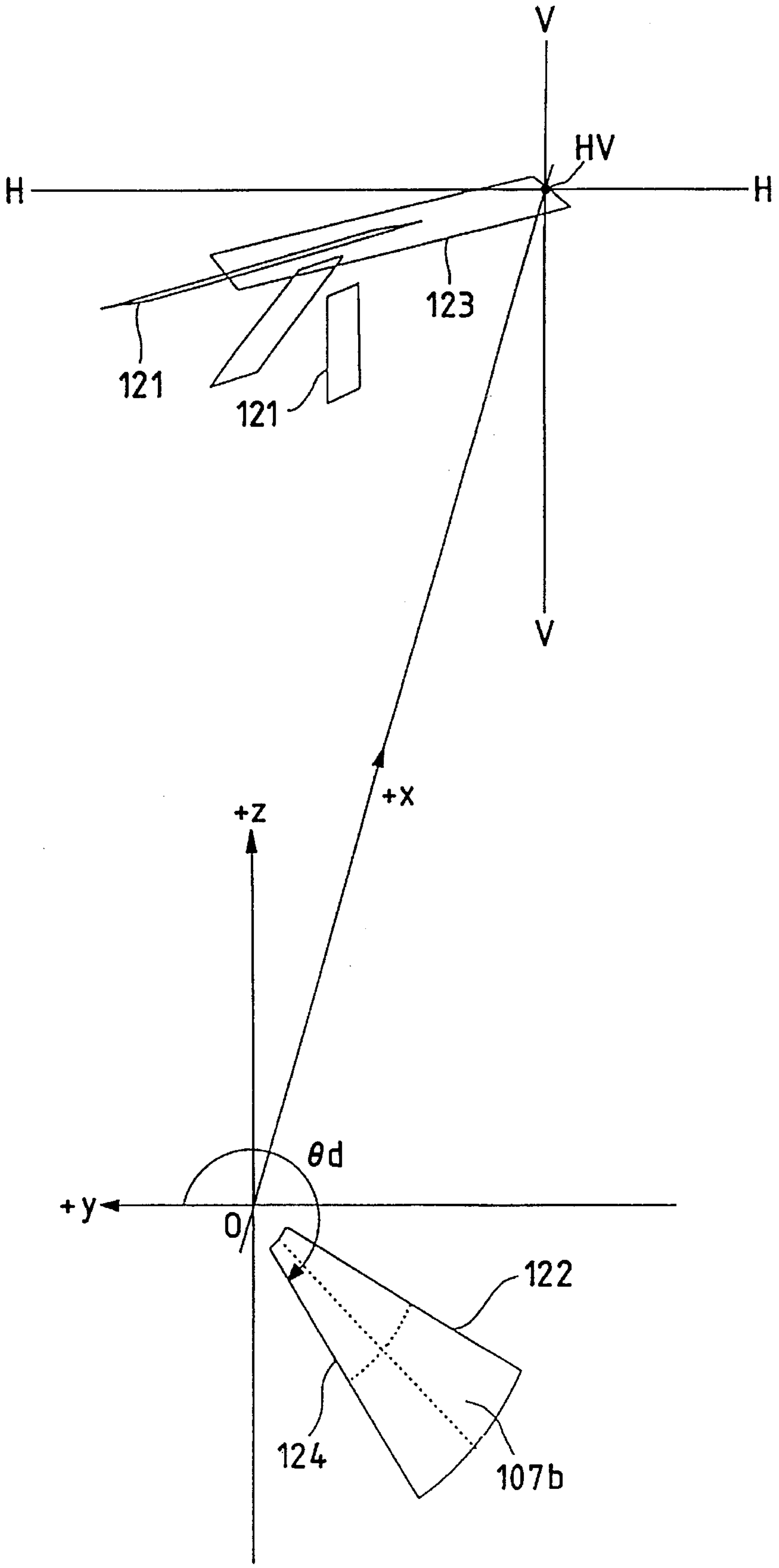
FIG. 19 is a diagram explaining a partial region 107*b* of the region 107 and a tendency of the layout of its filament images.
Figure 20:
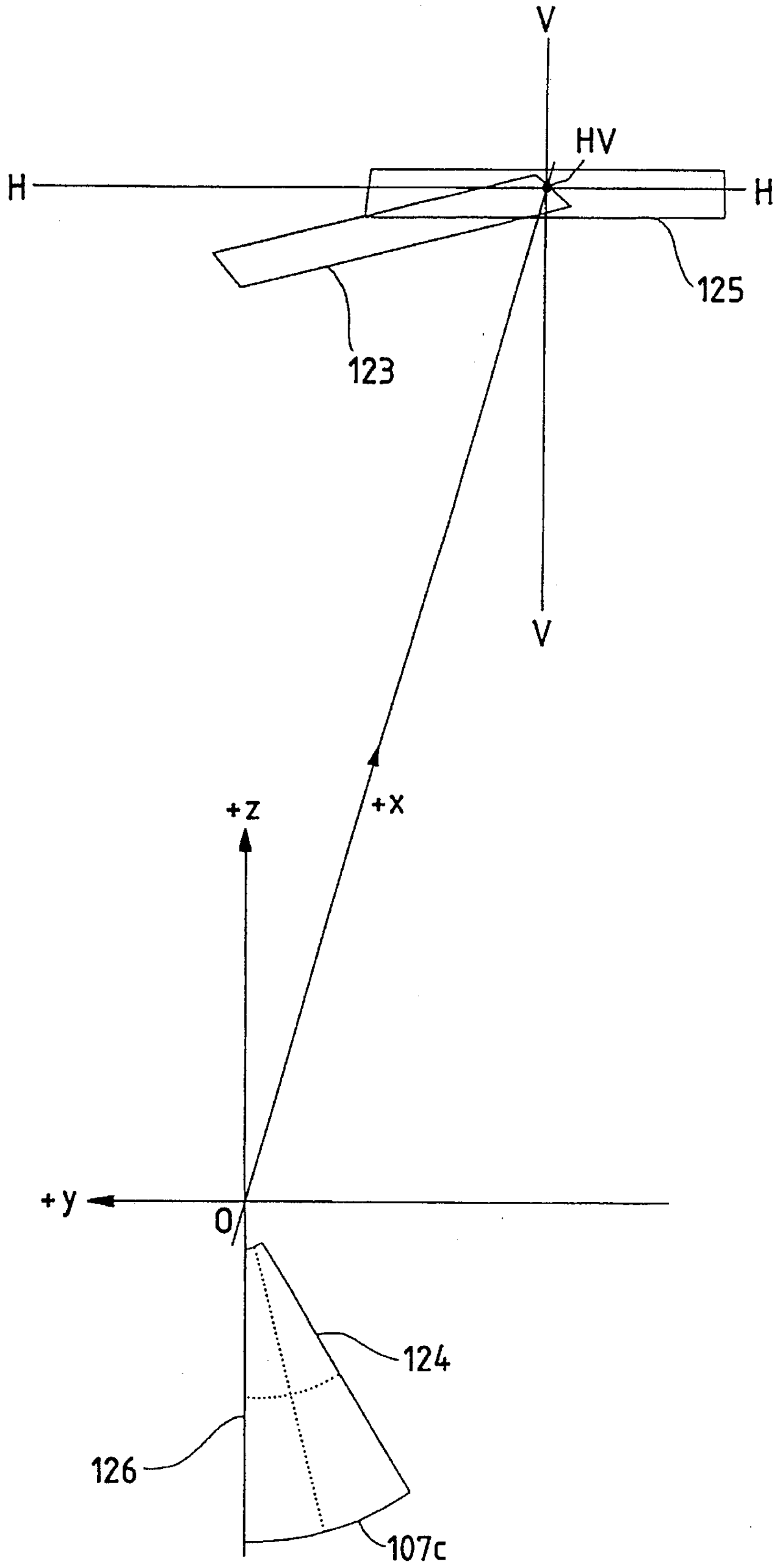
FIG. 20 is a diagram explaining a partial region 107*c* of the region 107 and a tendency of the layout of its filament images.

FIGS. 18 to 20 respectively show representative layouts of the filament images in a case where the region 107 is divided into three parts.

FIG. 18 shows a region 107*a* which is located closest to the x-y plane in the region 107, as well as a tendency of the layout of the filament images.

In FIG. 18, filament images 119, 119, . . . which are located in the vicinities of the line V—V and extends in the horizontal direction are projected by representative points located on a line of intersection 120 between the region 107*a* and the x-y plane. Meanwhile, filament images 121, 121, . . . which are located below the images 119 are projected by representative points located on a line of intersection 122 between the region 107*a* and the plane of θ=θc (>180°) including the x-axis. A change can be seen in the layout of the filament image due to the effect of the twisting operation of the surface.

FIG. 19 shows a region 107*b* which is located in the middle of the third quadrant in the region 107, as well as a tendency of the layout of the filament images.

A filament image 123 which extends diagonally downward to the lower left from the vicinity of the point HV in the drawing, is projected by representative points located on a line of intersection 124 between the region 107*b* and the plane of θ=θd (>θc) including the x-axis. Incidentally, the filament images 121 are projected by the representative points on the line of intersection 122, as described above.

FIG. 20 shows a region 107*c* which is located closest to the x-z plane in the region 107, as well as a tendency of the layout of the filament images.

A filament image 125 is projected by representative points on a line of intersection 126 between the x-z plane and the region 107*c*, and the filament image 125 extends in the horizontal direction with its central portion located substantially on the point HV. Incidentally, the filament image 123 in the drawing is projected by the representative points on the line of intersection 124, as described above.

The tendency of the layout of the filament images concerning the left-hand half of the basic surface can be understood from FIGS. 13 to 20 described above. As for the remaining right-hand half, since the basic surface has a substantially symmetrical shape with respect to the x-z plane, the tendencies of the layout of the filament images concerning the regions 105 and 108 are similar to those in the case of the regions 106 and 107 (it will suffice if the case is considered by reversing the orientation of the angle parameter), so that a description thereof will be omitted.

Figure 21:
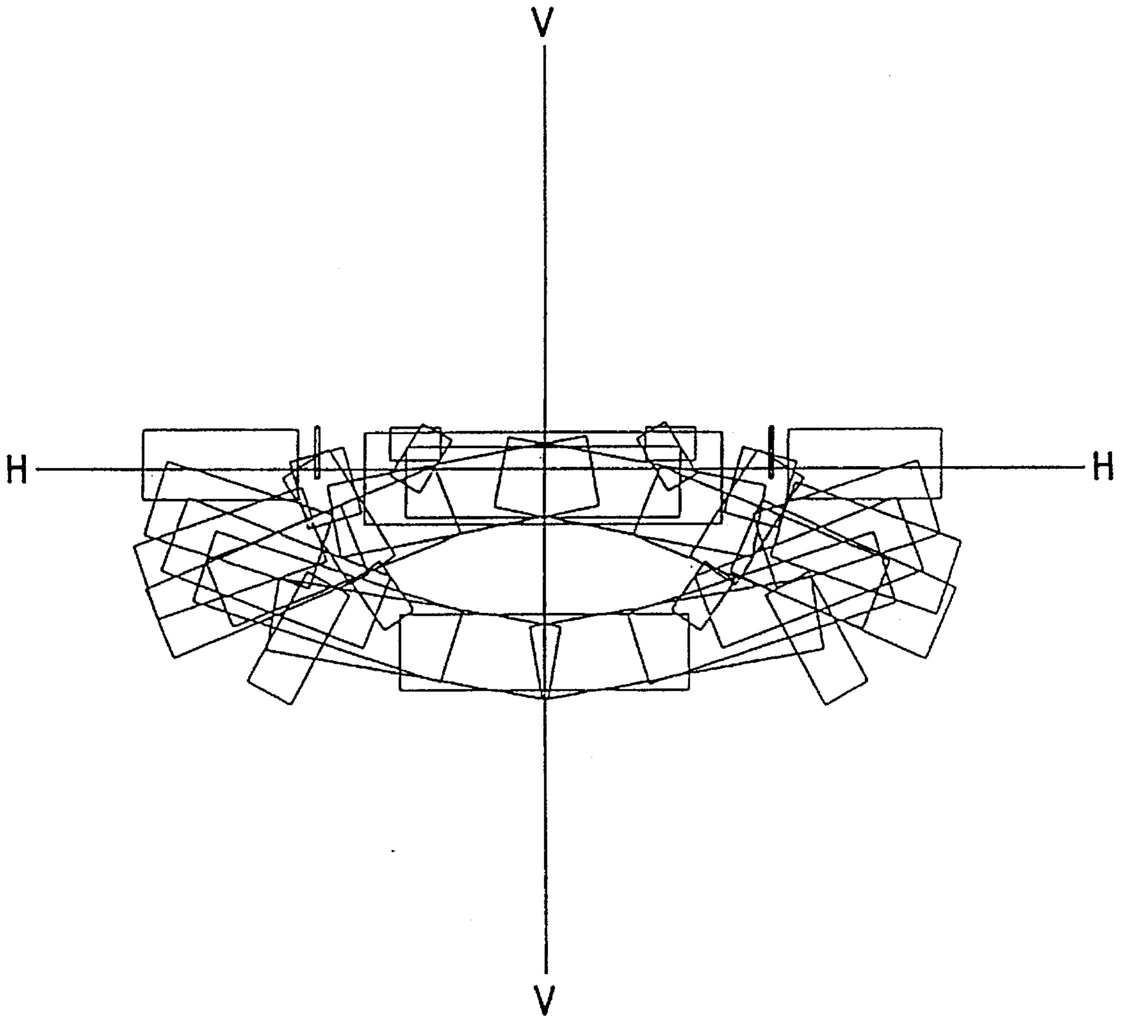
FIG. 21 is a diagram explaining a tendency of the layout of filament images with respect to the overall reflecting surface.

FIG. 21 shows a tendency of the overall layout of the filament images, and was depicted by combining some of the filament images obtained by the regions 105 to 108.

The filament images contributing to the formation of an upper edge of the cutline are located in the vicinities of the line H—H, and are arranged so that their upper edges do not rise above a predetermined height, whereby a clear line constituting a basis of the horizontal cutline is formed. Incidentally, although upper edges of the entire projected filament images are located on the upper side of the line H—H, it goes without saying that the cutline is positioned at or below the horizontal line in the light-distribution pattern by the subsequent aiming adjustment of a headlamp assembly.

In addition, an actual reflecting surface has a shape cut from a portion of the above-described basic surface in conformity to the front shape of the headlamp assembly. For instance, in the case of a straight-sided headlamp assembly, a range which is rectangular in a front view is used.

Similar to the first embodiment, also in the second embodiment, by combining the front lens 4 as shown in FIGS. 8 and 9 and the above-described reflecting surface, it is possible to form a light-distribution pattern 30 having a horizontal diffusion angle δ of 60° to 80° or thereabouts, as shown in FIG. 10.

As is apparent from the foregoing description, in accordance with the second embodiment of the present invention, the tendency of the layout of projected filament images of the light source member is defined by adding deformations to an elliptical paraboloid whose cross section at a plane perpendicular to the principal optical axis is an ellipse, so as to ensure that the projected filament images are not located on the upper side of the horizontal line, thereby reducing dazzling light. In addition, with respect to projected filament images of the light source member which are disposed in close proximity to the horizontal line and in parallel thereto in the light-distribution pattern, the projected filament images are arranged so that their upper edges do not rise above the horizontal line, thereby making it possible to form a clear line constituting a basis of the horizontal cutline.

In addition, also in the second embodiment of the present invention, horizontally diffusing lens steps each having a parabolic horizontal cross section are formed on a reverse surface of the front lens, so that it is possible to obtain a light-distribution pattern which is diffused widely in the horizontal direction, without adversely affecting the formation of the horizontal cutline by the reflector.

What is claimed is:

1. A headlamp for an automobile which comprises a reflector and a front lens disposed in front of said reflector and which is capable of obtaining a light-distribution pattern having a horizontal cutline parallel to a horizontal line, wherein:

(a) a light source member is disposed such that a central axis of said light source extends along a principal optical axis of said reflector;

(b) a reflecting surface of said reflector has a basic surface of a shape obtained by adding deformations to an elliptical paraboloid which has an elliptical cross section at a plane perpendicular to said principal optical axis;

(c) a focal length of a parabola which is a sectional figure obtained when said basic surface is cut by a horizontal plane including said principal optical axis is set to be smaller than a focal length of a parabola which is a sectional figure obtained when said basic surface is cut by a vertical plane including said principal optical axis; and (d) a projection pattern obtained by said reflecting surface is located on a lower side of a horizonal pattern line in said light-distribution pattern, a twist is added to a region of said reflecting surface located in close proximity to said horizontal plane including said principal optical axis of said reflector, and upper edges of projected filament images of said light source member due to said region are aligned so as to form a line constituting a basis of said horizontal cutline.

2. A headlamp for an automobile according to claim 1, wherein horizontally diffusing lens steps each having a parabolic horizontal cross section are formed on a reverse surface of said front lens.

3. A headlamp for an automobile which comprises a reflector and a front lens disposed in front of said reflector and which is capable of obtaining a light-distribution pattern having a horizontal cutline parallel to a horizontal line, wherein:

(a) a light source member is disposed such that a central axis of said light source orthogonally intersects a principal optical axis of said reflector and extends along a horizontal direction;

(b) a reflecting surface of said reflector has a basic surface of a shape obtained by adding deformations to an elliptical paraboloid which has an elliptical cross section at a plane perpendicular to said principal optical axis;

(c) when an angle parameter is set in which an angle increases counterclockwise in a front view with a horizontal plane including said principal optical axis as a reference, which are projected forwardly by a region of said reflecting surface located on an upper side of said horizontal plane including said principal optical axis; are arranged in such a manner as to move form a right position, when seen in a light projection direction, in a vicinity of said horizontal line to a lower position below said horizontal line with an increase of said angle parameter until said projected filament images are located at a lowest position on a vertical line, and to rise upward with a further increases of said angle parameter until said projected filament images are positioned at a left position, when seen in said light projection direction, in a vicinity of said horizontal line on an opposite side of said first position with said vertical line placed therebetween, said projected filament images being arranged so that their upper edges do not rise above said horizontal pattern line; and (d) projected filament image of said light source member, which are projected forwardly by a region of said reelecting surface located on a lower side of said horizontal plane including said principal optical axis, are arranged in such a manner as to move from a left position, when seen in said light projection direction, in a vicinity of said horizontal line to a lower side of said horizontal line with an increase of said angle parameter, to be subsequently located in a vicinity of a point of intersection of said horizontal line and said vertical line, and to move to the lower side of said horizontal line with a further increase of said angle parameter until said projected filament images are positioned at a right position, when seen in said light projection direction, in a vicinity of said horizontal line on an opposite side of said second position with said vertical line placed therebetween, said projected filament images being arranged so that their upper edges do not rise above said horizontal cutline.

4. A headlamp for an automobile according to claim 3, wherein horizontally diffusing lens steps each having a parabolic horizontal cross section are formed on a reverse surface of said front lens.

5. A headlamp for an automobile which comprises a reflector having a reflecting surface and a principal optical axis, a light source member, and a front lens disposed in front of said reflector and which is capable of obtaining a light-distribution pattern having a horizontal cutline parallel to a horizontal line, wherein:

(a) when an angle parameter is set in which an angle increases counterclockwise in a front view with a horizontal plane including said principal optical axis as a reference, projected filament images of said light source member, which are projected forwardly by a region of said reflecting surface located on an upper side of said horizontal plane including said principal optical axis, move at an almost constant rate in an initial stage when said angle parameter increases from the horizontal line to a vertical line, and move at a faster rate as said angle parameter approaches the vertical line; and (b) projected filament images of said light source member, which are projected forwardly by a region of said reflecting surface located on a lower side of said horizontal plane including said principal optical axis, move at an almost constant rate in an initial stage when said angle parameter increases from said horizontal line to said vertical line, and move at a faster rate as said angle parameter approaches said vertical line.

6. A head lamp for an automobile according to claim 5, wherein said light source member is disposed such that a central axis of said light source extends along a principal optical axis of said reflector.

7. A head lamp for an automobile according to claim 5, wherein said light source member is disposed such that a central axis of said light source orthogonally intersects a principal optical axis of said reflector and extends along a horizontal direction.

8. A headlamp for an automobile according to claim 5, wherein a focal length of a parabola which is a sectional figure obtained when a basic surface of said reflecting surface is cut by a plane including said principal optical axis, changes by a larger amount when said angle parameter changes near a vertical line than when said angle parameter changes near the horizontal line.

9. A headlamp for an automobile which comprises a reflector having a reflecting surface formed as a free surface and a principal optical axis, and a front lens disposed in front of said reflector and which is capable of obtaining a light-distribution pattern having a horizontal cutline parallel to a horizontal line, wherein:

(a) a light source member having a filament is disposed such that a central axis of said light source member orthogonally intersects said principal optical axis of said reflector and extends along a horizontal direction; and (b) projected filament images of said light source member, which are projected forwardly by said reflecting surface, defining an elliptical-shape-like-portion at a center of said projected filament images, said elliptical portion being darker than other portions of said projected filament images, and upper edges of said projected filament images being located at or below said horizontal cutline.

* * * * *